March 28, 1950 C. W. LINDER 2,502,097
PARACHUTE RELEASE MECHANISM
Filed April 30, 1949
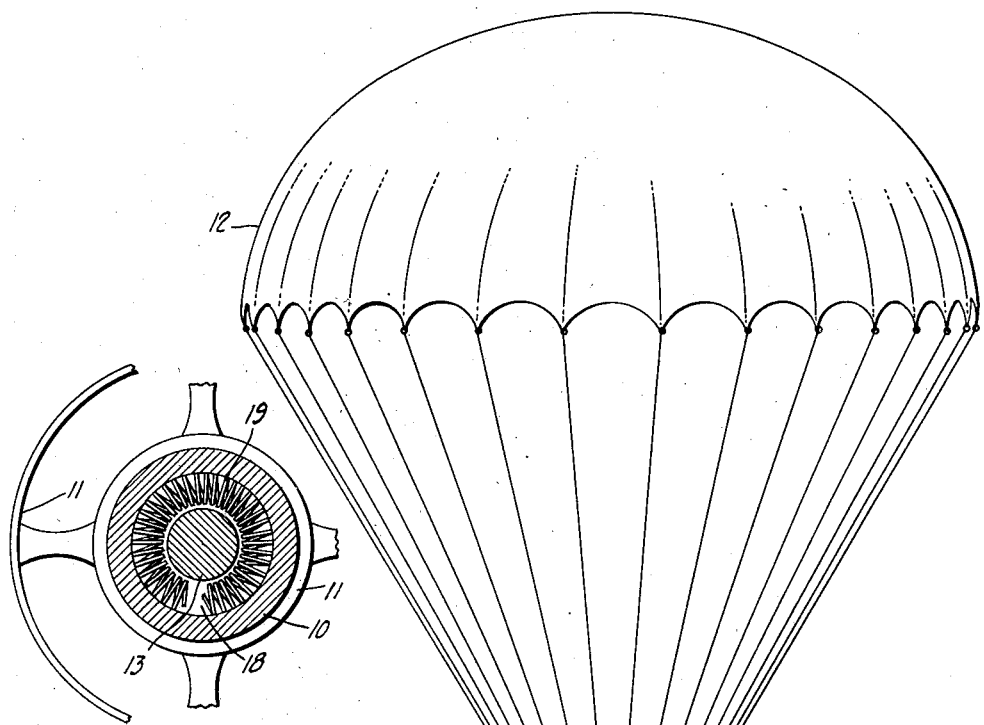
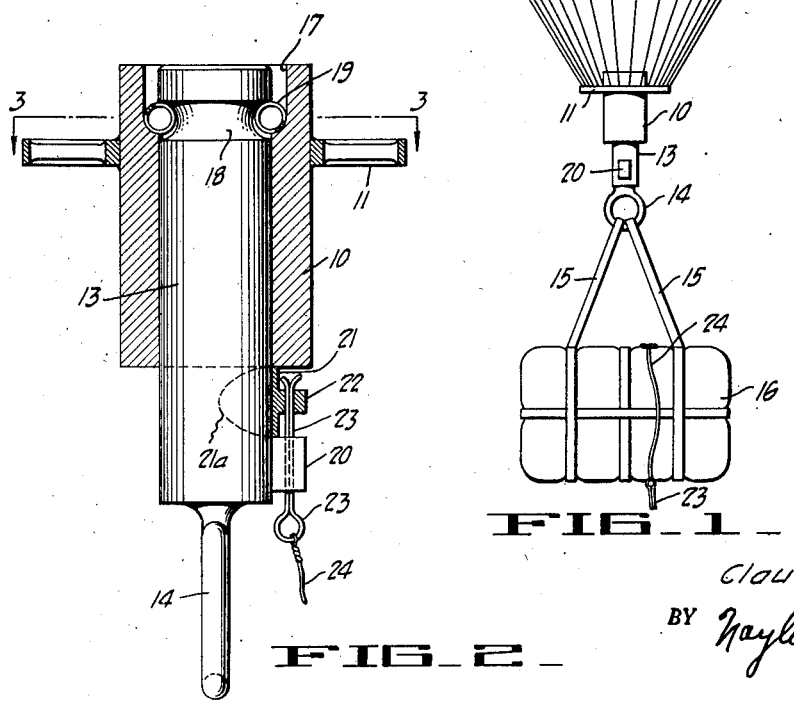
INVENTOR.
Claude W. Linder.
BY Naylor & Lassagne
ATTORNEYS.

Patented Mar. 28, 1950

2,502,097

UNITED STATES PATENT OFFICE 2,502,097

PARACHUTE RELEASE MECHANISM

Claude W. Linder, San Mateo, Calif., assignor of three-fifths to Ruby Lee Boyle, San Francisco, Calif.

Application April 30, 1949, Serial No. 90,739

4 Claims. (Cl. 294—83)

This invention relates to automatic release couplings and more specifically to release couplings for parachutes, especially cargo parachutes where it is important that the load be securely coupled to the parachute during descent but that the coupling be released to free the parachute upon contact of the load with the ground.

The main objects of the invention are to provide a simplified and inexpensive form of couplings of the kind above referred to embodying means to prevent accidental disconnection before launching of the parachute and during descent thereof, but which will automatically be released through relative movement of certain of its parts caused by impact with the ground.

The foregoing objects, as well as other purposes and advantages, are attained by the arrangement of parts and details of construction hereinafter described and claimed and illustrated by the accompanying drawing, where Figure 1 is a view of a parachute carrying a load or cargo by means of the coupling device of this invention;

Figure 2 is a vertical sectional view of the coupling showing the relation of the parts thereof before the load carried thereby is air-borne; and Figure 3 is a sectional view taken along lines 3—3 of Figure 2.

In the preferred form of the invention here disclosed the coupling consists of a tubular member or sleeve 10 having a shroud ring 11 fixed thereto near its upper end to which is secured the shroud lines of a conventional cargo parachute 12. The cylindrical bore of the sleeve 10 is adapted to slidably receive a cylindrical coupling rod 13 which is longer than the sleeve and normally extends below it. The lower end of rod 13 is formed with a suspension ring 14, or the like, to which the load straps 15 of a load 16 are connected.

The automatically releasable inter-lock between the sleeve 10 and load carrying rod 13 is effected by forming the cylindrical bore of sleeve 10 with an enlarged terminal portion 17 adjacent the upper end of the sleeve and providing a complemental circumferential groove 18 in the upper end of rod 13 so that the enlarged portion 17 of the bore and the circumferential groove together form a seating space for reception of a length of normally straight coil spring 19 which is of just sufficient length to encircle rod 13 when fitted in groove 18. This spring is placed in position by projecting rod 13 above the sleeve and then retracting it with the spring 19 manually held in groove 18 until it is held within the enlargement 17 of the sleeve bore. With spring 19 in position rod 13 can not be withdrawn downwardly through the sleeve bore as contact of the spring 19 with the shoulder at the bottom of enlargement 17 forms a positive stop. On the other hand a slight upward movement of rod 13 will bring groove 18 and spring 19 above the end of sleeve 10 allowing spring 19 to straighten and fly free, whereupon rod 13 drops from sleeve 10.

As it is essential that the interlock of rod 13 and sleeve 10 be maintained against accidental releases until the parachute with its load is launched, after which the tension of the load on rod 13 will maintain the interlock, the lower projecting end of rod 13 is provided with a fixed lug 20 formed with a vertically extending opening therethrough. The space between lug 20 and the lower end of sleeve 10 is sufficient to allow spring 19 to be carried above the upper end of sleeve 10 by upward movement of rod 13, and to prevent such movement before launching, a spring spacing member 21 occupies the space between lug 20 and the end of sleeve 10. This spacing member is of spring steel and has opposite arms 21a which are forced apart to partly embrace rod 13 when the spacer is placed in position. Spacer 21 is formed with a projecting lug 22 formed with a vertical opening adapted to be brought into alignment with the opening in lug 20 and a cotter-pin 23 serves to retain the spacer 21 in position during preparation of the parachute and load for launching. To effect release of the spacer after launching, the eye of cotter-pin 23 is connected by a cord 24 with the load. This cord is shorter than the distance of the load from the end of rod 13 when the load is air borne and as load tension is applied to rod 13 the cotter pin will be withdrawn from lugs 20 and 22 and the resiliency of spacer 21 will cause it to be projected from its position thereby leaving rod 13 free to slide upward in sleeve 10 upon contact of the load with the ground.

As will be understood from the foregoing description, the weight of the load on rod 13 will securely hold spring 19 in seated position in groove 18 and the bore enlargement 17 while the load is air borne, but upon slight upward movement of rod 13 in sleeve 10 due to load contact with the ground rod 13 will be automatically freed and the parachute will fly free without dragging its load. Also, the provision of spring spacer 21 which remains securely in position until the parachute is launched and becomes inflated will efficiently prevent accidental release of the load prior to launching and before the load is air borne. A simple, efficient and inexpensive device is accordingly made available in this invention and while a preferred form of construction has been disclosed it will be obvious to those skilled in the art that various modifications in details of construction are possible within the scope of the invention as defined in what is claimed below.

I claim:

1. A release coupling for parachutes comprising a sleeve member having the upper terminal portion of its bore enlarged forming an internal supporting shoulder, means on the sleeve for attaching parachute shrouds, a load carrying rod adapted for axial movement in the sleeve and formed with a circumferential groove normally in complemental relation to said shoulder and enlarged bore portion, said rod having a portion extending beyond the lower end of the sleeve, means for locking the rod against withdrawal from the sleeve comprising a length of coil spring seated in said groove and confined by the wall of said enlarged bore portion, contact of the circumference of the spring with said shoulder in the enlarged bore portion constituting a stop, said spring being self released when carried beyond the upper end of the sleeve by axial movement of the rod, a stop on the projecting portion of the rod below the sleeve for preventing movement of the rod, and means actuated by load tension for releasing said stop.

2. A release coupling for parachutes comprising a sleeve member having the upper terminal portion of its bore enlarged forming an internal supporting shoulder, means on said sleeve for attaching parachute shrouds, a load carrying rod adapted for axial movement in said sleeve and formed with a circumferential groove normally in complemental relation to said shoulder and enlarged bore portion, and means for locking the rod against withdrawal from the sleeve comprising a length of coil spring seated in said groove and normally in engagement with the shoulder and wall of the enlarged portion of the sleeve bore, said spring being self released to free the rod when carried beyond the upper end of the sleeve by axial movement of the rod.

3. A release coupling for parachutes comprising a sleeve member having the upper terminal portion of its bore enlarged forming an internal supporting shoulder, means on the sleeve for attaching parachute shrouds, a load carrying rod adapted for axial movement in the sleeve, means for locking the load carrying rod against withdrawal from the sleeve comprising a resilient locking member carried by the rod normally in contact with said shoulder and confined by the wall of said enlarged bore portion, said locking element being self released when carried beyond the upper end of the sleeve through axial movement of said rod, and means releasable by application of load tension for locking the rod and sleeve against relative movement prior to launching.

4. A release coupling for parachutes comprising a sleeve member having the upper terminal portion of its bore enlarged forming an internal supporting shoulder, means on the sleeve for attaching parachute shrouds, a load carrying rod adapted for axial movement in the sleeve, and means for locking the load carrying rod against withdrawal from the sleeve comprising a resilient locking member carried by the rod normally in contact with said shoulder and confined by the wall of said enlarged bore portion, said locking element being self released when carried beyond the upper end of the sleeve through axial movement of said rod.

CLAUDE W. LINDER.

No references cited.